2,865,171

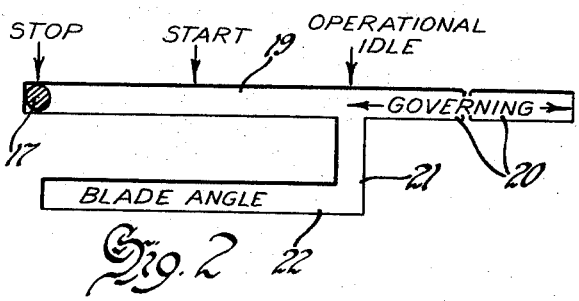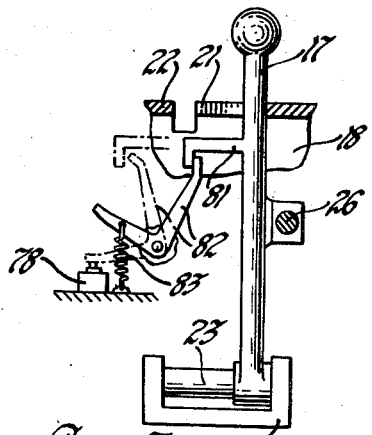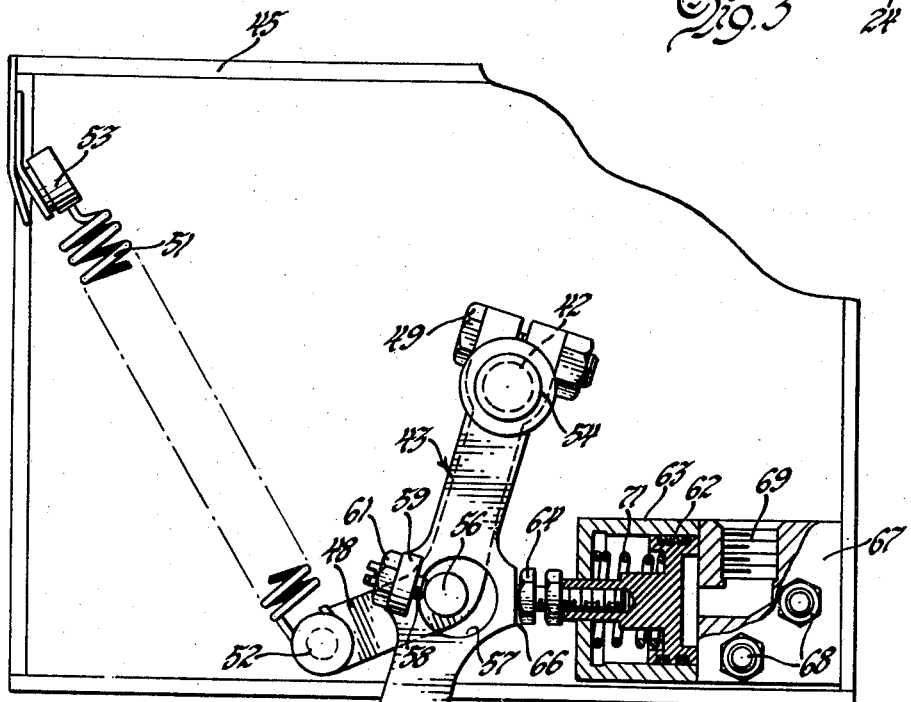

ENGINE GOVERNOR SETTING MECHANISM

Arthur W. Gaubatz, Indianapolis, Ind., assignor to General Motors Corporation, Detroit, Mich., a corporation of Delaware Application August 25, 1954, Serial No. 452,167

2 Claims. (Cl. 60—39.28)

My invention relates to engine control and particularly to an improvement in controls of turboprop engines. In the copending application of Boyer, Gaubatz, Irwin and Wente, Serial No. 194,716, filed November 8, 1950, there is described a control system for a turboprop engine in which the pilot or flight engineer by a power control lever controls jointly a gas turbine engine and a variable pitch propeller driven thereby. In one slot of the power control lever quadrant the engine is started, idled, and, as the lever is advanced, is operated for normal flight under speed governing control of the propeller and variable power output control of the engine.

By moving the control lever through a gate into a parallel slot, the control is modified to provide for taxiing and braking of the plane. In this blade angle control regime, the propeller pitch is set directly and the engine is controlled by a governor. When the control lever is operated to put the power plant and propeller in the blade angle control regime, the load on the engine is increased.

For this reason, there are advantages to providing a control to the governor which will anticipate to some extent the movements of the power control lever and advance the speed setting of the governor, which will increase the supply of fuel to the engine, upon initiation of the shift to the blade angle control regime.

The nature of the invention and the advantages thereof will be more clearly apparent from consideration of the succeeding description and the accompanying drawings in which Fig. 1 is a schematic diagram of a turboprop power plant and control system therefor in which the invention is incorporated;

Fig. 2 is a diagram of the movements of the power control lever;

Fig. 3 illustrates the arrangement for actuation of a switch by the power control lever upon movement into the blade angle control quadrant; and Fig. 4 is an elevation view of the power unit control device.

Figure 1:
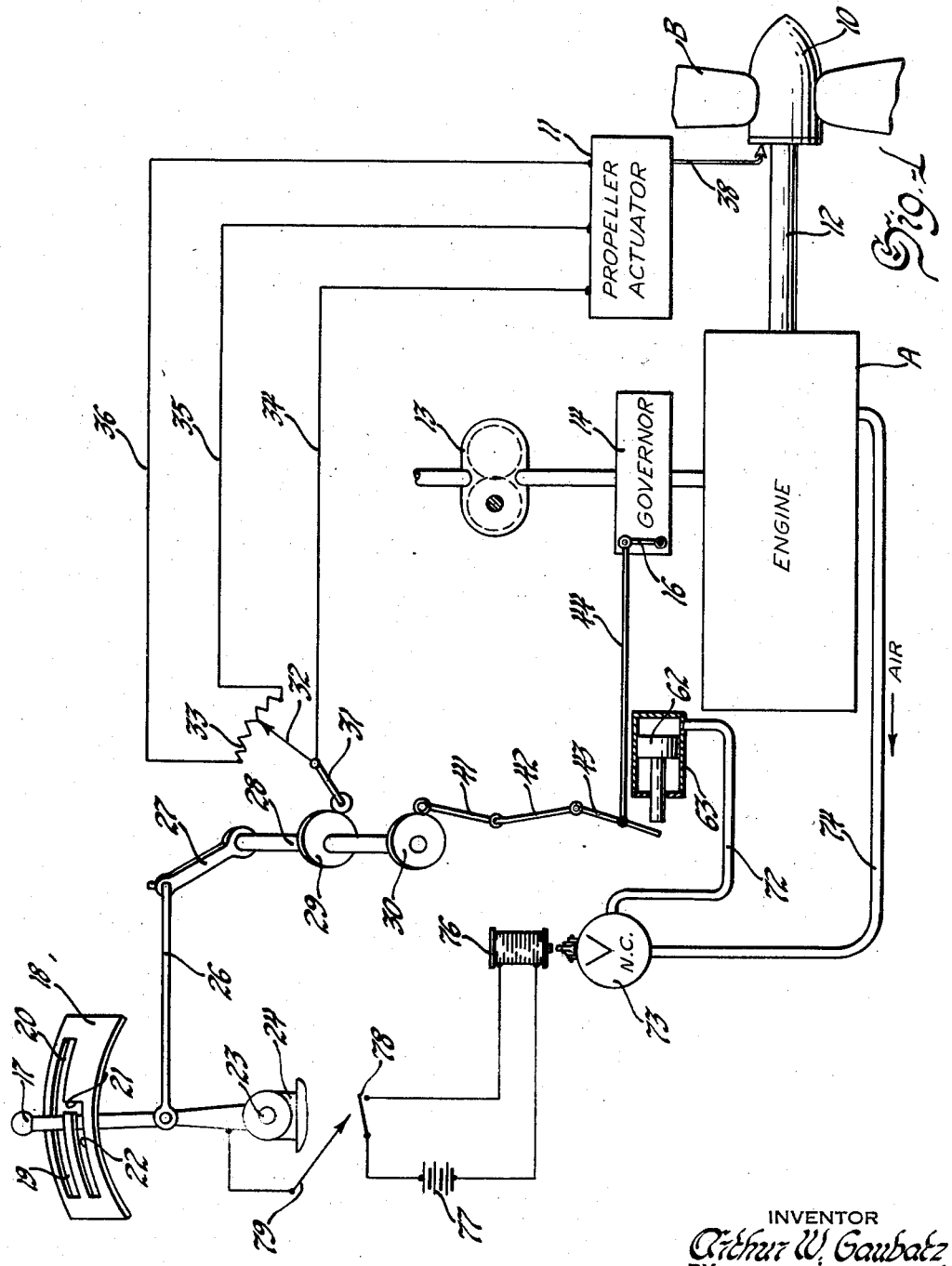

Referring first to Fig. 1, the invention is shown as applied to a power plant including an engine A and a propeller B. The engine may be a conventional gas turbine engine and, therefore, no details need be explained. The propeller B is of a type which is operable at desired values of blade angle set by a pitch control device 10 in the propeller which, in turn, is controlled by an actuator 11. The details of this structure are immaterial to the invention. The propeller may be of the type described in U. S. Patent 2,699,304, Control for a Plurality of Variable Pitch Counterrotating Propellers, Treseder et al., assigned to the assignee of the present invention. The general control system for the engine and propeller may be the same as or similar to that described in the abovementioned application Serial No. 194,716. That system is one of considerable complexity and the details of the system are not requisite to an understanding of this invention. Therefore, Fig. 1 shows only enough of the system to understand the application thereto and significance of the present invention. In this connection, it may be noted that Fig. 1 illustrates a single engine directly coupled to the propeller rather than two engines coupled to the propeller through the clutches and, in general, simplifies the showing.

Continuing now with the description of the system, the engine A drives the propeller B through a shaft 12. The engine is supplied with fuel from a pump 13 through a fuel control device 14 including a variable engine speed governor settable by an arm 16. To provide for control of the speed setting of the governor and the pitch setting of the pitch control 10, a pilot's control lever 17 is shiftable in a quadrant 18, which, as shown more clearly in Fig. 2, includes a slot 19 through which the control lever 17 is moved from a stop position to a start position and an operational idle position into a governing range 20 which is employed in normal operation of the engine. For blade angle control, the lever is shifted laterally through a slot 21 into a blade angle control quadrant 22. As illustrated more or less schematically (see also Fig. 3), the lever 17 is rotatable and slidable on a shaft 23 mounted in a support 24 and is coupled by link 26 to an arm 27 on a camshaft 28. The camshaft 28 is part of a unit control which correlates the operation of the engine and propeller and includes a cam 29 for control of the propeller and a cam 30 for control of the governor 14. The cam 29 actuates a follower 31 including a contact arm 32 movable over a potentiometer 33. The potentiometer is energized from a suitable source and is connected through leads 34, 35, and 36 to the propeller actuator 11 which includes a motor actuated by conventional follow-up control means to reproduce the position of the transmitting or controlling potentiometer arm 32. The potentiometer 33 may correspond to potentiometer 128 shown in Figure 8 of application Serial No. 194,716, which figure shows the electrical circuits by which the potentiometer controls a follow-up motor, identified as 76, in the actuator. This actuator corresponds to the actuator 42 of Patent 2,699,304, which patent discloses mechanism by which the actuator is connected to the propeller and controlling mechanism within the propeller. The actuator is coupled mechanically by means forming a part of the propeller indicated by the arrow 38 to the pitch control 10 of the propeller so that movement of the control arm 17 through the cam 29, and the electrical transmission, and the actuator effects setting of propeller pitch as the arm is moved through the slot 22. In the governing control slot 20 the actuator is moved farther so that it effects operation of the propeller under speed governing control, but this is immaterial to present considerations.

The cam 30 in the unit control operates through a follower arm 41, a shaft 42, and arm means 43, which will be more fully explained in connection with Fig. 4, to actuate a link 44 coupled to the input or speed setting arm 16 of the governor 14.

Fig. 4 is an elevation view of a unit control 45 which houses the cams 29 and 30 and followers 31 and 41 and receives an input from the control lever 17. The input arm 27 of the unit control 45 is not shown in Fig. 4. The arm means 43 and link 44 which couples it to the governor are shown. Arm means 43 comprises an arm 46 coupled by bolt or pin 47 to link 44 and rotatably mounted on the end of shaft 42 which extends from the unit control 45. The arm means 43 also includes an arm 48 which is of dog-leg configuration and which is fixed to the shaft 42 so as to rotate therewith by suitable means which may comprise a tangent screw adjusting arrangement 49 as described in my Patent 2,627,188. A tension spring 51 coupled between a pin 52 on the arm 48 and abutment 53 on the control device urges arm 48 clockwise.

Arm 46 is rotatably mounted on shaft 42 adjacent arm 48 and may be retained by a retaining screw 54. A pin 56 extends laterally from the arm 48 through a hole 57 in the arm 46 and engages an adjustable abutment screw 58 passing through a tab 59 on the arm 46 and locked by jam nut 61. Arm 46 is urged counterclockwise by spring means (not illustrated) which, in this case, is a spring in the governor 14 which urges the governor toward low speed, which is in the direction to put tension on the link 44. The fuel governor may be of any suitable type. It is well known that many conventional governors incorporate flyweights which act against a spring and the speed setting is increased by increasing the compression or tension of the spring. So far as the present invention is concerned, it is immaterial whether the force which biases arm 46 counterclockwise is imparted to it by the governor or by any suitable biasing means which may be provided. By virtue of the engagement of pin 56 with screw 58, the shaft 42 and arm 48 operate to pull arm 46 and thus the governor toward higher speed settings. This structure admits of some lost motion in the direction of increasing speed to the extent of the clearance between the pin 56 and the right side of hole 57. When the governor is set in low speed position, as when the engine is idling, the arm 46 may be moved clockwise to the extent of this lost motion independently of movement of the arm 48 by a piston 62 reciprocable in a cylinder 63 and having an adjustable tappet 64 thereon engageable with an abutment 66 on arm 46. The cylinder 63 may be integral with a mounting block or base 67 secured by capscrews 68 to the face of the control 45. Air under pressure may be supplied to the right face of piston 62 through a connection 69, which moves the piston to the left against the action of compression spring 71, to push arm 46 to the left and thus increase the governor speed setting, unless arm 46 has already been moved beyond the reach of the tappet 64.

Referring now to Fig. 1, cylinder 63 may be supplied with air through a connection 72 and a suitable solenoid-operated valve 73 from any suitable source such as a line 74 extending from the compressor of the engine A. Valve 73 may be opened by energization of solenoid 76 which is in circuit with a source of potential 77 and a normally open switch 78. Arrow 79 on Fig. 1 indicates schematically an operating linkage between control lever 17 and the switch 78. Such a connection may be as shown in Fig. 3, in which the control lever 17 has fixed thereon an arc 81 which slides over one arm of a bellcrank lever 82 pivotally mounted on the control quadrant and urged counterclockwise as shown by spring 83. When lever 17 is moved into blade angle control slot 22, the arm 82 moves as indicated by the broken lines to engage the actuator of switch 78 and close the circuit. This opens the valve 73, energizing cylinder 62 to advance the governor setting as previously described.

By way of further explanation of the significance of the invention, it will be seen from Fig. 2 that when the lever 17 is moved into blade angle control it moves from operational idle at which the governor speed setting is low. The speed setting is low at this point to conserve fuel. As lever 17 moves rearwardly through the quadrant 22, the propeller is controlled from positive pitch for taxiing forward through zero pitch to negative pitch for maneuvering or taxiing. At operational idle, the propeller is in flat pitch. By providing the switch 78, which is closed as the lever moves through the cross slot 21, the governor setting is advanced and thereby the engine is in underspeed condition with respect to the governor setting, so that the governor supplies more fuel to the engine. The engine speed setting is increased as the lever 17 moves through slot 21 before the control lever moves through slot 22 to control propeller pitch. The application of the load of the propeller by a change in pitch as it moves into and through the quadrant 22 is thus anticipated, and the load is assumed more smoothly.

While one embodiment of the invention has been shown to illustrate the principles and advantages thereof, it will be apparent that it is capable of application to various situations and may be modified in various ways within the scope of the invention by the exercise of skill in the art.

I claim:

1. In combination, an engine, a governor controlling the engine, a load device driven by the engine, means for varying the power requirements of the load, means for varying the speed setting of the governor, a common control device for the two said means, and means, actuated by initial movement of the control device in a sense tending to increase the load power requirement, to effect an anticipating advance of the governor setting; the last-named means comprising a first arm actuated by the control device, a second arm actuated by the first arm through means providing a lost motion connection, and a means for moving the second arm through the range of the lost motion.

2. In combination, an engine, a governor controlling the engine, a load device driven by the engine, means for varying the power requirements of the load device, means for varying the speed setting of the governor, a common control device for the two said means, and means, connected to the means for varying the governor speed setting and actuated by initial movement of the control device in a sense tending to increase the load power requirement, to effect an anticipating advance of the governor setting; the last-named means comprising a first arm actuated by the control device, a second arm actuated by the first arm through means providing a lost motion connection, an operator for moving the second arm through the range of the lost motion, and means actuated by the said initial movement of the control device to energize the operator.

References Cited in the file of this patent

UNITED STATES PATENTS

| | | |
|---|---|---|
| 2,391,323 | Martin | Dec. 18, 1945 |
| 2,494,630 | Richmond | Jan. 17, 1950 |
| 2,628,684 | Slatter et al. | Feb. 17, 1953 |
| 2,640,550 | Knapp et al. | June 2, 1953 |
| 2,640,551 | Plumb | June 2, 1953 |
| 2,667,935 | Woodward | Feb. 2, 1954 |
| 2,688,229 | Lee | Sept. 7, 1954 |
| 2,740,483 | Machlanski | Apr. 3, 1956 |

FOREIGN PATENTS

| | | |
|---|---|---|
| 609,233 | Great Britain | Sept. 28, 1948 |
| 903,082 | France | Sept. 24, 1945 |